United States Patent Office 2,918,369
Patented Dec. 22, 1959

2,918,369

NON-IONIC BENZIMIDAZOLE CYANINE DYES CONTAINING IN α-POSITION A CYANO GROUP ON THE METHENYL CHAIN

Norman J. Doorenbos, Binghamton, N.Y., assignor to General Aniline & Film Corporation, New York, N.Y., a corporation of Delaware No Drawing. Application June 15, 1956
Serial No. 591,520

5 Claims. (Cl. 96—106)

The present invention relates to sensitizing dyes which are cyanine dye bases containing a benzimidazole nucleus with a cyano group on the methenyl chain thereof, said cyano group being α to or on the adjoining carbon atom to that of the benzimidazole nucleus to which said methenyl chain is linked, and to silver halide emulsions, particularly paper emulsions, containing such sensitizing dyes.

It is known that cyanine dye bases with a cyano group α to a heterocyclic nucleus will sensitize photographic emulsions and, in this connection, reference is made to Brooker et al., U.S. 2,345,094 and 2,393,743. Typically, these patents describe the preparation and use of sensitizing dyes with a cyano group α to the carbon atom of a benzothiazole or a quinoline nucleus to which the methenyl chain is joined.

The dyes of these patents do not exhibit outstanding properties as sensitizers, particularly in paper emulsions, whereas the dyes contemplated herein possess such properties. This is attributable to a different but very important structural feature between the dyes hereof and those disclosed in said prior patents.

The dyes hereof contain a nitrogen atom with a hydrogen atom which is separated by two carbon atoms from the cyano group. This hydrogen atom is capable of forming hydrogen bonds with atoms which have an unshared pair of electrons, such as occurs in the nitrogen atom of the cyano group. Such hydrogen bonding is known to occur both intermolecularly and intramolecularly. Tests which I have conducted lead me to believe that hydrogen bonding occurs between the hydrogen atom of the imidazole ring and a cyano group and that this hydrogen bonding is responsible for the excellent sensitizing properties of these dyes.

Of course, this is theory which has not been established in fact. It is a fact, however, that if the aforesaid hydrogen atom be substituted by some other group, it would preclude the possibility of hydrogen bonding occurring and the resulting dyes would be poor sensitizers.

It is an object of the present invention to provide cyanine dye bases containing a benzimidazole nucleus and a cyano group on the methine chain that is α to the carbon atom in said nucleus to which said chain is linked.

A further object is to provide cyanine dye bases which contain a hydrogen atom attached to a nitrogen atom in a benzimidazole nucleus such that this nitrogen atom is two carbon atoms removed from a cyano group in the methine chain.

A further object of the invention are silver halide emulsions, particularly paper emulsions, sensitized with the aforesaid cyanine dye bases.

Other objects and purposes will become apparent as the description proceeds.

The sensitizing dyes contemplated herein have the following general formula:

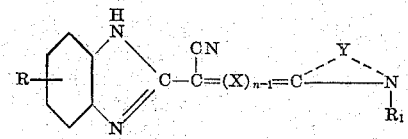

wherein R is hydrogen; halogen, such as chlorine or bromine; cyano; carboxy; hydroxy; alkylamino, such as methylamino, ethylamino, diethylamino and the like; alkylthio, such as methylthio, ethylthio and the like; alkyl, such as methyl, ethyl, propyl, butyl and the like; or alkyloxy, such as methoxy, ethoxy, propoxy and the like; $R_1$ is alkyl, such as methyl, ethyl, propyl or the like; carboxyalkyl, such as carboxyethyl, carboxypropyl or the like; acyloxyalkyl, such as acetoxyethyl, acetoxypropyl and the like; Y is the non-metallic atoms necessary to complete a 5- or 6-membered heterocyclic ring system of the type usual in cyanine dyes, such as a thiazole, a thiazoline, a benzothiazole, a naphthiazole, a selenazole, a benzoselenazole, a naphthselenazole, an oxazole, a benzoxazole, a naphthoxazole, an indolenine, a quinoline, a pyridine or the like; X represents a methine chain of 2 carbon atoms, a carbon atom of which may be substituted by alkyl, such as methyl, ethyl or the like; and $n$ represents a positive integer of from 1 to 4.

The above dyes are prepared by condensing a 2-cyanomethylbenzimidazole with a cyclammonium quaternary salt containing in a reactive position a halogen atom, a thioether group, a β-arylaminovinyl group, a β-arylacylaminovinyl group, an ω-arylamino-1,3-butadienyl group, an ω-arylacylamino-1,3,5-butadienyl group, an ω-arylamino-1,3,5-hexatrienyl group and an ω-arylacylamino-1,3,5-hexatrienyl group. The cyanomethyl compound may have a variety of substituents as previously indicated, but the hydrogen atom that is associaed with a nitrogen atom in the 1-position of the benzimidazole nucleus must not be replaced by any other group.

It is recommended that condensing agents be utilized to effect the reaction between the cyanomethylbenzimidazole and the cyclammonium quaternary salt. Such condensing agents should be basic in character. Condensing agents which I have found suitable are sodium acetate, triethylamine, piperidine and the like. It is preferable to carry out the condensations in a solvent, such as an alcohol of low molecular weight as represented by methanol, ethanol and 1-propanol, for example. Heat accelerates the condensation.

My invention also embraces the use for cyanine dye formation of two cyanomethylbenzimidazole intermediates not previously described in the literature. These intermedaites are (I) 2-cyanomethyl-5(6)-methylbenzimidazole of the formula:

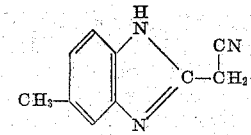

and (II) 2-cyanomethyl-5(6)-chlorobenzimidazole of the formula:

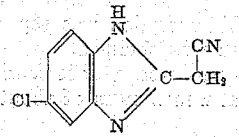

Compound I is prepared by the method described by R. A. Copeland for 2-cyanomethylbenzimidazole (J.A.C.S. 65, 1072 (1943)), excepting that an equivalent amount of the intermediate, p-methyl-o-phenylenediamine, was substituted for o-phenylenediamine. The product had a melting point of 181–182° C.

Compound II is prepared according to the aforesaid Copeland procedure excepting that an equivalent amount of p-chloro-o-phenylenediamine was substituted for o-phenylenediamine. The product had a melting point of 103–104° C.

The aforesaid cyanine dye bases form stable salts with certain acids, such as hydrochloric acid, hydrobromic acid and the like. These salts are much more soluble than the dye bases. The salts, when used in photographic silver halide emulsions, respond in the same way as the dye bases. With the salts, dye solutions of varying concentrations may be prepared.

The aforesaid dyes and their salts are used to sensitize silver halide emulsions, particularly paper emulsions, by adding thereto an amount ranging from about 1 to 40 mgs. per kilogram of emulsion. A peculiarity of these dyes and their salts is that they effectively sensitize in concentrations lower than those usual with known cyanine dyes.

The invention is illustrated by the following examples, it being understood, however, that such examples are illustrative and not limitative.

EXAMPLE I 2-(α-cyano-γ-[3-ethyl-5,6-dimethyl-2(3H) - benzoxazolylidene]-propenyl)-5(6)-methylbenzimidazole

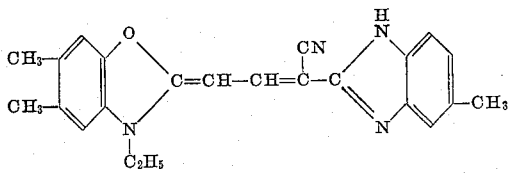

5.7 grams of 2-cyanomethyl-5(6)-methylbenzimidazole, 15.0 grams of 2-(β-acetanilidovinyl)-5,6-dimethylbenzoxazole ethiodide and 10 cc. of triethylamine were placed in 200 cc. of methyl alcohol. The mixture was boiled, under reflux for 10 minutes, the dye base precipitating during this period. The solution was filtered hot and the precipitate washed with ether. The dye was suspended in methanol and the mixture was boiled, under reflux for 2 minutes, chilled and filtered. This operation was repeated until a pure sample of dye was obtained. The product melted with decomposition at 296–300° C. and had a maximum absorption in methyl alcohol solution of 4400 A.

The aforesaid dye base sensitized a light sensitive silver paper emulsion at a maximum of about 510 mμ.

EXAMPLE II 2-(α-cyano-γ-[3-ethyl-5,6-dimethyl-2(3H) - benzoxazolylidene]-propenyl)-5(6)-methylbenzimidazole 200 milligrams of 2-cyanomethyl-5(6)-methylbenzimidazole, 400 mgs. of 2-(β-acetanilidovinyl)-5,6-dimethylbenzoxazole ethiodide and 0.5 ml. of triethylamine were placed in 10 cc. of methyl alcohol. The mixture was boiled, under reflux for 3 minutes. The dye which precipitated was filtered from the hot solution and washed with ether. The dye was suspended in 2 cc. of methyl alcohol and boiled, under reflux for 1 minute, chilled and filtered. This operation was repeated until a pure sample of the dye was obtained.

The dye base sensitized a light sensitive silver halide paper emulsion at a maximum of about 510 mμ.

EXAMPLE III 2-(α-cyano-γ-[3-ethyl-2(3H)-benzoxazolylidene]-propenyl)-5(6)-methylbenzimidazole

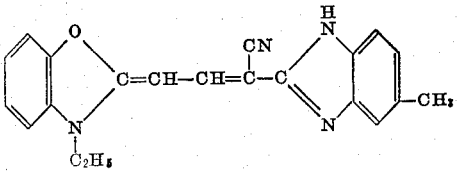

This compound was prepared according to Example II, excepting that an equivalent amount of the intermediate 2-(β-acetanilidovinyl)benzoxazole ethiodide was used in lieu of 2-(β-acetanilidovinyl) - 5,6 - dimethylbenzoxazole ethiodide.

The product melted with decomposition at 180–184° C. and had a maximum absorption in methyl alcohol solution of 4350 A.

The aforesaid dye base sensitized a light sensitive silver halide paper emulsion at a maximum of about 500 mμ.

EXAMPLE IV 2-(α-cyano-γ-[3-ethyl-2(3H)-benzothiazolylidene]-propenyl)-5(6)-methylbenzimidazole

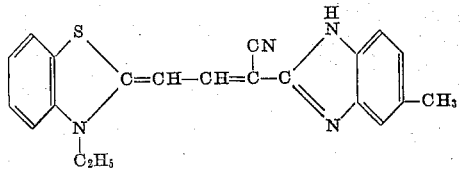

This compound was prepared according to Example II, excepting that an equivalent amount of the intermediate 2-(β-acetanilidovinyl)-benzothiazole ethiodide was used in lieu of 2-(β-acetanilidovinyl)-5,6-dimethylbenzoxazole ethiodide.

The product melted with decomposition at 270–274° C. and had an absorption maximum in methyl alcohol solution of 4710 A.

The aforesaid dye base sensitized a light sensitive silver halide paper emulsion at a maximum of about 540 mμ.

EXAMPLE V

2 - (α-cyano-γ-[3-ethyl-5,6-methylenedioxy-2(3H) - benzolylidene]-propenyl)-5(6)-methylbenzimidazole

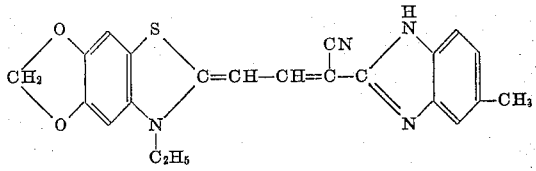

This compound was prepared according to Example II, excepting that an equivalent amount of the intermediate 2-(β-acetanilidovinyl) - 5,6 - methylenedioxybenzothiazole ethiodide was used in lieu of 2-(β-acetanilidovinyl)-5,6-dimethylbenzoxazole ethiodide.

The product melted with decomposition at 309–312° C. and had a maximum absorption in methyl alcohol solution of 5050 A.

The dye base sensitized a light sensitive silver halide paper emulsion at a maximum of about 565 mμ.

EXAMPLE VI 2-(α-cyano-γ-[3-ethyl-2(3H)-benzoxazolylidene]-propenyl)-benzimidazole

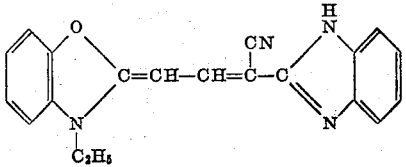

This compound was prepared according to Example II, excepting that equivalent amounts of the intermediate, cyano-methylbenzimidazole and 2-(β-acetanilidovinyl)-benzoxazole ethiodide were used in lieu of 2-cyanomethyl-5(6)-methylbenzimidazole and 2-(β-acetanilidovinyl)-5,6-dimethylbenzoxazole ethiodide, respectively.

The product melted with decomposition at 267–270° C. and had a maximum absorption in methyl alcohol solution of 4350 A.

The aforesaid dye base sensitized a light sensitive silver halide paper emulsion at a maximum of about 500 mμ.

EXAMPLE VII 2-(α-cyano-γ-[3-ethyl-5,6-dimethyl-2(3H)-benzoxazolylidene]-propenyl)-benzimidazole

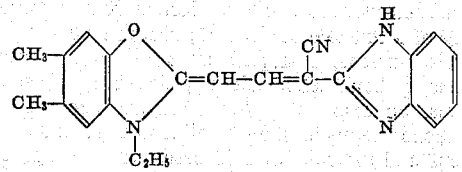

This compound was prepared according to Example II, excepting that an equivalent amount of the intermediate, cyanomethylbenzimidazole was used in lieu of 2-cyanomethyl-5(6)-methylbenzimidazole.

The product melted with decomposition at 323–324° C. and had an absorption maximum in methyl alcohol solution of 4400 A.

The aforesaid dye base sensitized a light sensitive silver halide paper emulsion at a maximum of about 505 mμ.

EXAMPLE VIII 2-(α-cyano-γ-[3-ethyl-2(3H)-benzothiazolylidene]-propenyl)-benzimidazole

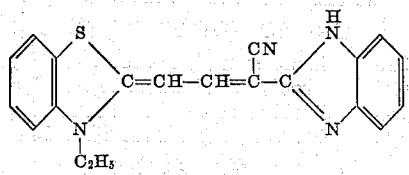

This compound was prepared according to Example II, excepting that equivalent amounts of the intermediates, cyanomethylbenzimidazole and 2-(β-acetanilidovinyl)-benzothiazole ethiodide were used in lieu of 2-cyanomethyl-5(6)-methylbenzimidazole and 2-(β-acetanilidovinyl)-5,6-dimethylbenzoxazole ethiodide, respectvely.

The product melted with decomposition at 332–333° C. and had a maximum absorption in methyl alcohol solution of 4690 A.

The dye base sensitized a light sensitive silver halide paper emulsion at a maximum of about 540 mμ.

EXAMPLE IX 2-(α-cyano-γ-[3-ethyl-5,6-methylenedioxy-2(3H)-benzothiazolylidene]-propenyl)-benzimidazole

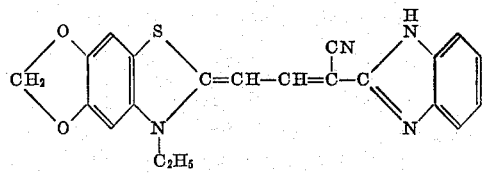

This compound was prepared according to Example II, excepting that equivalent amounts of the intermediates, cyanomethylbenzimidazole and 2-(β-acetanilidovinyl)-5,6-methylenedioxybenzothiazole ethiodide were used in lieu of 2-cyanomethyl-5(6)-methylbenzimidazole and 2-(β-acetanilidovinyl)-5,6-dimethylbenzoxazole ethiodide, respectively.

The product melted with decomposition at 325–327° C. and had a maximum absorption in methyl alcohol solution of 5050 A.

The aforesaid dye base sensitized a light sensitive silver halide paper emulsion at a maximum of about 560 mμ.

EXAMPLE X 2-(α-cyano-γ-[3-ethyl-5,6-dimethyl-2(3H)-benzoxazolylidene]-propenyl)-5(6)-chlorobenzimidazole

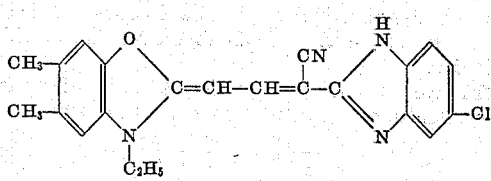

The compound was prepared according to Example II, excepting that an equivalent amount of the intermediate, 2-cyanomethyl-5-chlorobenzimidazole was used in lieu of 2-cyanomethyl-5(6)-methylbenzimidazole.

The product melted with decomposition at 332–333° C. and had a maximum absorption in methyl alcohol solution at 4440 A.

The dye base sensitized a light sensitive silver halide paper emulsion at a maximum of about 510 mμ.

EXAMPLE XI 2-(α-cyano-β-ethyl-γ-[3-methyl-4,5-benzo-2(3H)-benzothiazolylidene]-propenyl)-benzimidazole

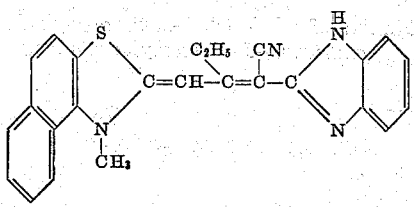

This compound was prepared according to Example II, excepting that equivalent amounts of the intermediates, 2-cyanomethylbenzimidazole and 2-(β-ethylmercapto-β-ethylvinyl)-4,5-benzobenzothiazole methiodide were used in lieu of 2-cyanomethyl-5(6)-methylbenzimidazole and 2-(β-acetanilidovinyl)-5,6-dimethylbenzoxazole ethiodide.

The product melted with decomposition at 257–259° C. and had a maximum absorption in methyl alcohol solution of 4780 A.

This dye base sensitized a light sensitive silver halide paper emulsion at a maximum of about 440 mμ.

EXAMPLE XII 2-(α-cyano-β-ethyl-γ-[3-ethyl-6-methyl-2(3H)-benzothiazolylidene]-propenyl)-5(6)-methylbenzimidazole

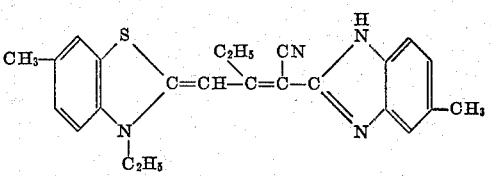

This compound was prepared according to Example II, excepting that an equivalent amount of the intermediate, 2-(β-ethylmercapto-β-ethylvinyl)-6 - methylbenzothiazole ethiodide was used in lieu of 2-(β-acetanilidovinyl)-5,6-dimethylbenzoxazole ethiodide.

The product melted with decomposition at 209–211° C. and had a maximum absorption in methyl alcohol solution of 4660 A.

The dye base sensitized a light sensitive silver halide paper emulsion at a maximum of about 440 mμ.

EXAMPLE XIII

*2-(α-cyano-α-[3-ethyl-2(3H)-benzothiazolylidene]-methenyl)-5(6)-methylbenzimidazole*

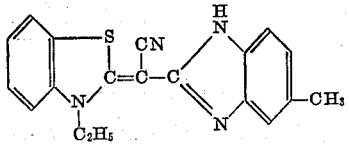

The procedure is the same as in Example II, excepting that the 5,6-dimethylbenzoxazole is substituted by an equivalent quantity of 2-ethylmercaptobenzothiazole ethiodide.

The dye base sensitized a light sensitive silver halide paper emulsion at a maximum of about 475 mμ.

EXAMPLE XIV

*2-(α-cyano-ε-[3-ethyl-2(3H)-benzthiazolylidene]-1,3-pentadienyl)-5(6)-methylbenzimidazole*

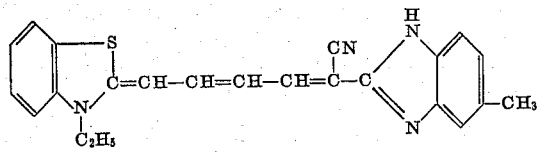

The procedure is the same as in Example II, excepting that the 5,6-dimethylbenzoxazole derivative is substituted by an equivalent amount of 2-(4-acetanilido)1,3-butadienylbenzothiazole ethiodide.

EXAMPLE XV

*5-(α-cyano-η-[3-ethyl-2(3H)-benzoxazolylidene]-1,3,5-heptatrienyl)-5(6)-methylbenzimidazole*

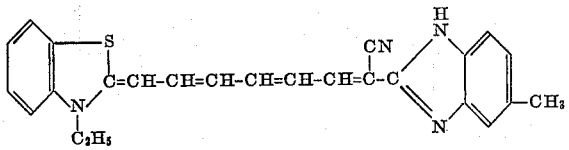

The procedure is the same as in Example II, excepting that the 5,6-dimethylbenzoxazole is replaced by an equivalent quantity of 2,6-acetanilido-(1,3,5-hexatrienyl)-benzoxazole ethiodide.

Modifications of the invention will occur to persons skilled in the art and I, therefore, do not intend to be limited in the patent granted except as necessitated by the appended claims.

I claim:

1. A light sensitive silver halide emulsion containing as a sensitizing dye a compound selected from the class consisting of those of the following formula:

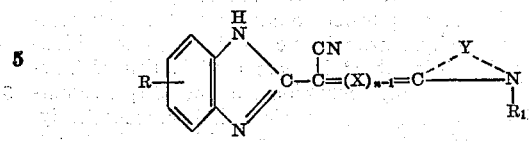

wherein R is a radical selected from the class consisting of hydrogen; halogen; cyano; carboxy; hydroxy; alkoxy; alkylthio; amino and alkyl of up to 4 carbon atoms, $R_1$ is a radical selected from the class consisting of alkyl of up to 4 carbon atoms; carboxyalkyl and acyloxyalkyl, X is a methine chain of 2 carbon atoms, a carbon atom of which may be substituted by alkyl of up to 4 carbon atoms, n is a positive integer from 1 to 4 and Y represents the non-metallic atoms necessary to complete a nitrogenous heterocyclic nucleus selected from the class consisting of a thiazole nucleus, a thiazoline nucleus, a benzthiazole nucleus, a naphthiazole nucleus, a selenazole nucleus, a benzoselenazole nucleus, a naphthselenazole nucleus, an oxazole nucleus, a benzoxazole nucleus, a naphthoxazole nucleus, a quinoline nucleus and a pyridine nucleus and the salts of said bases with strong acids.

2. The composition as defined in claim 1, wherein n is 2.

3. The composition as defined in claim 1, wherein the sensitizing dye is 2-(α-cyano-γ-[3-ethyl-5,6-dimethyl-2(3H)-benzoxazolylidene]-propenyl) - 5-methylbenzimidazole.

4. The composition as defined in claim 1, wherein the sensitizing dye is 2-(α-cyano-γ-[3-ethyl-2(3H)-benzoxazolylidene]-propenyl)-5-methylbenzimidazole.

5. The composition as defined in claim 1, wherein the sensitizing dye is 2-(α-cyano-β-ethyl-γ-[3-ethyl-6-methyl-2(3H)-benzothiazolylidene]-propenyl) - 5 - methylbenzimidazole.

References Cited in the file of this patent

UNITED STATES PATENTS

| | | |
|---|---|---|
| 2,213,238 | Brooker et al. | Sept. 3, 1940 |
| 2,345,094 | Brooker et al. | Mar. 28, 1944 |
| 2,393,743 | Brooker et al. | Jan. 29, 1946 |
| 2,778,823 | Brooker et al. | Jan. 22, 1957 |

FOREIGN PATENTS

| | | |
|---|---|---|
| 552,921 | Great Britain | Apr. 30, 1943 |

OTHER REFERENCES

Mees: "The Theory of the Photographic Process," Revised Ed., page 379, Macmillan Co., N.Y., 1954. (Copy in Scientific Library.)

UNITED STATES PATENT OFFICE
CERTIFICATE OF CORRECTION

Patent No. 2,918,369                                December 22, 1959

Norman J. Doorenbos

It is hereby certified that error appears in the printed specification of the above numbered patent requiring correction and that the said Letters Patent should read as corrected below.

Column 7, line 35, Example XV, in the heading thereto, for italicized "5", first occurrence, read "2" italcized; line 38, same Example XV, the "S" atom appearing in the 2-position of the left-hand heterocyclic ring should appear as an -- O -- atom.

Signed and sealed this 31st day of May 1960.

(SEAL)
Attest:

KARL H. AXLINE
Attesting Officer

ROBERT C. WATSON
Commissioner of Patents